(12) United States Patent
March

(10) Patent No.: US 6,785,299 B1
(45) Date of Patent: Aug. 31, 2004

(54) OPTIMIZED HIGH-LEVEL DATA LINK CONTROL ENCODING/DECODING

(75) Inventor: James H. March, Grass Valley, CA (US)

(73) Assignee: 3Com Corporation, Marlborough, MA (US)

(*) Notice: Subject to any disclaimer, the term of this patent is extended or adjusted under 35 U.S.C. 154(b) by 0 days.

(21) Appl. No.: 09/322,886

(22) Filed: May 29, 1999

(51) Int. Cl.[7] .............................. H04J 3/00; H04J 3/06; H04J 3/12; H03M 5/00
(52) U.S. Cl. ..................... 370/506; 370/514; 370/476; 370/528; 341/58
(58) Field of Search ................................ 370/465, 470, 370/471, 472, 473, 474, 475, 476, 510, 503, 505, 506, 512, 514, 528, 412, 413; 341/58

(56) References Cited

U.S. PATENT DOCUMENTS

| | | | | |
|---|---|---|---|---|
| 5,465,345 A | * | 11/1995 | Blanc et al. ........... | 395/200.15 |
| 5,675,617 A | * | 10/1997 | Quirk et al. ................ | 370/365 |
| 6,054,942 A | * | 4/2000 | Stemmler ..................... | 341/58 |
| 6,178,185 B1 | * | 1/2001 | Marks ......................... | 370/514 |
| 6,442,178 B1 | * | 8/2002 | Arato et al. ................ | 370/506 |
| 6,539,023 B1 | * | 3/2003 | Bartholomay et al. ...... | 370/412 |

* cited by examiner

Primary Examiner—Hanh Nguyen
(74) Attorney, Agent, or Firm—McDonnell Boehnen Hulbert & Berghoff

(57) ABSTRACT

A system and method are provided for encoding and decoding a bitstream according to the High level Data Link Control protocol (HDLC) without having to analyze the bitstream bit by bit. An optimized encoder and an optimized decoder are provided. Both encoder and decoder analyze their respective input streams by using a number of bits in parallel as an index into a table, the contents of which control an action by the encoder or decoder that emits in parallel a number of output bits.

20 Claims, 17 Drawing Sheets

```c
# include "defs.h"
# include "struc.h"
# include "dmp_api.h"
typedef void (*PFNTXGET) ( uint32[] );
static void getbits_s( uint32 BitArray[] );
static void getbits_a( uint32 BitArray[] );
extern    tModemSRAM *pSupeComStruct;
uint8 TxClamp = 1;
static uint8 xTbl[256] =
{
    // Bits       Field Definition/Usage
    // 7 Zero Insertion Required after mask
    // 6-4        Unused
    // 3-0        Data bit count to extract (value: 4-8)

// 00   01   02   03   04   05   06   07   08   09   0a   0b   0c   0d   0e   0f
    /*0x*/ 0x08,0x08,0x08,0x08,0x08,0x08,0x08,0x08,0x08,0x08,0x08,0x08,0x08,0x08,0x08,0x08,
    /*1x*/ 0x08,0x08,0x08,0x08,0x08,0x08,0x08,0x08,0x08,0x08,0x08,0x08,0x08,0x08,0x08,0x85,
    /*2x*/ 0x08,0x08,0x08,0x08,0x08,0x08,0x08,0x08,0x08,0x08,0x08,0x08,0x08,0x08,0x08,0x08,
    /*3x*/ 0x08,0x08,0x08,0x08,0x08,0x08,0x08,0x08,0x08,0x08,0x08,0x08,0x08,0x08,0x86,0x85,
    /*4x*/ 0x08,0x08,0x08,0x08,0x08,0x08,0x08,0x08,0x08,0x08,0x08,0x08,0x08,0x08,0x08,0x08,
    /*5x*/ 0x08,0x08,0x08,0x08,0x08,0x08,0x08,0x08,0x08,0x08,0x08,0x08,0x08,0x08,0x08,0x85,
    /*6x*/ 0x08,0x08,0x08,0x08,0x08,0x08,0x08,0x08,0x08,0x38,0x08,0x08,0x08,0x08,0x08,0x08,
    /*7x*/ 0x08,0x08,0x08,0x08,0x08,0x08,0x08,0x08,0x08,0x08,0x08,0x08,0x87,0x87,0x86,0x85,
    /*8x*/ 0x07,0X07,0x07,0x07,0x07,0x07,0x07,0x07,0x07,0x07,0x07,0X07,0x07,0x07,0x07,0x07,
    /*9x*/ 0x07,0x07,0x07,0x07,0x07,0x07,0x07,0x07,0x07,0x07,0x07,0x07,0x07,0x07,0x07,0x85,
    /*ax*/ 0x07,0x07,0x07,0x07,0x07,0x07,0x07,0x07,0x07,0x07,0x07,0x07,0x07,0x07,0x07,0x07,
    /*bx*/ 0x07,0x07,0x07,0x07,0x07,0x07,0x07,0x07,0x07,0x07,0x07,0x07,0x07,0x07,0x86,0x85,
    /*cx*/ 0x06,0x06,0x06,0x06,0x06,0x06,0x06,0x06,0x06,0x06,0x06,0x06,0x06,0x06,0x06,0x06,
    /*dx*/ 0x06,0x06,0x06,0x06,0x06,0x06,0x06,0x06,0x06,0x06,0x06,0x06,0x06,0x06,0x06,0x85,
    /*ex*/ 0x05,0x05,0X05,0X05,0X05,0x05,0x05,0x05,0x05,0x05,0X05,0x05,0x05,0x05,0x05,0x05,
    /*fx*/ 0x04,0x04,0x04,0x04,0x04,0x04,0x04,0x04,0x88,0x88,0x88,0x88,0x87,0x87,0x86,0x85
};
static PFNTXGET txd_vect = NULL;
static uint16       tx_idle = 0xffff;
static unsigned char *pTxByte = NULL;
static uint32       Blk_Hdr = 0;
static uint32       resid_data = 0;
static uint16       resid_size = 0;
static uint16       usNextBlkPtr = 0;
static uint16       usRemBytes = 0;
static uint16       usBlkFlags = 0;
static uint32       BitResid = 0;
static uint16       BitCnt = 0;
static uint8        TxMode = BPSDLC;
//*********************************************************************
//
// Function:     StartDSPinterval
// Usage: This function is called at the start of each modem channel
//               context switch. It adjusts two variables in the Shared RAM.
//
//*********************************************************************
void StartDSPinterval(void)
{
    ++pSupeComStruct->usDspProcCnt;
    pSupeComStruct->usTxIntvlBytes = 0;
    return;
}
```

FIG. 6a

```
//*********************************************************
//
// Function:   SetAsyncMode
// Usage:      This function sets internal parameters such that subsequent
//             calls to "get 64 bits" converts the input data stream into
//             an asynchronous bit stream, with Start/Stop bits. Also, idle
//             time on the line will generate MARKs (0xff) while in this mode.
//
//*********************************************************
void SetAsyncMode(void)
{
    txd_vect = getbits_a;                   // Set ultimate entrypoint
    tx_idle = 0xffff;                       // Set idle flags
    if( BitCnt )                            // Test if anything in the bit parse register
    { // Yes, fill out with MARKs
        BitResid = 0xffffffff << BitCnt | BitResid;
        BitCnt = 32;
    }
    TxMode = BPAsync;
}
//*********************************************************
//
// Function:   SetSyncMode
// Usage: This function sets internal parameters such that subsequent
//        calls to "get_64_bits" converts the input data stream into
//             an HDLC bit stream, with inserted zeros where needed. Also,
//             idle time on the line will generate HDLC Flags (0x7e) while
//             in this mode.
//
//*********************************************************
void SetSyncMode (void)
{
    txd_vect = getbits_s;      // Set ultimate entrypoint
    tx_idle = 0x7e7e;          // Set idle flags
    TxMode = BPSDLC;
}
//*********************************************************
//
// Function:   GetTxBytes
// Usage:      This function is used to obtain the next available one, or two
//             bytes from the Tx circular buffer. If a byte is available,
//             it/they is/are returned as a 16-bit value in the provided
//             variable, and the byte count is provided as a return value.
//             If no byte is available, the function returns a 0 value.
//
//             NOTE: This function should only modify the Tx Tail Pointer to
//                   the Tx Buffer. (It may examine the Tx Head Pointer.)
//*********************************************************
static int GetTxBytes(uint16 *bytes)
{
    void *pTxBuf;
    int bytecnt;
    unsigned char *rb;

if( usRemBytes == 0 )           // Test for end of block
    {                               // Yes, update Tail Ptr
        if( usBlkFlags & TX_EOF)    // Test if last block was End of Frame
        {
            usBlkFlags = 0;
            *bytes = tx_idle;                   // Set idle flags, as defined for mode
            return (int) 0;
        }
        pSupeComStruct->usTxTail = usNextBlkPtr;
        if( pSupeComStruct->usTxTail == pSupeComStruct->usTxHead )    // If empty buffer,
        {
            *bytes = tx_idle;                                          // return 16-bit flag
            return (int)0;
        }
        while( usRemBytes == 0 )
        {
                pTxBuf =(void *) *(dint32)pSupeComStruct //Point to next block in
                                                         //circular buffer
                            + pSupeComStruct->usTxStart
                            + (pSupeComStruct->usTxTail * 4) );
                Blk_Hdr = *(uint32 *)pTxBuf;                // Extract its header
                // Do Shared RAM accounting
                pSupeComStruct->usTxIntvlBytes += sizeof(Blk_Hdr);
                pSupeComStruct->usTxProcCnt += sizeof(Blk_Hdr);
                usBlkFlags = Blk_Hdr >> 16;                 // Extract block flags
                usRemBytes = Blk_Hdr & 0x0000ffff;          // Extract next blk size
                if( usBlkFlagS == TX_RESYNC_CONTROL )       // Test for buffer wrap
                        pSupeComStruct->usTxTail = 0;       // Yes, reset tail ptr to 0
                else
                        pSupeComStruct->usTxTail ++;        // advance tail ptr by 1
```

FIG. 6b

```
                    // Test for empty buffer
                    if( pSupeComStruct->usTxHead == pSupeComStruct->usTxTail )
                    {
                            bytes = tx_idle;                    // Yes, return 16-bit flag
                            return (int)0;
                    }
            }// End of while()

usNextBlkPtr = ( pSupeComStruct->usTxTail                   // Point to first data byte
                    + ((usRemBytes + 3)/4) );
    pTxByte = (unsigned char *)pTxBuf + sizeof(Blk_Hdr);
    if( usBlkFlags & TX_SOF )                                   // Test if Start of Frame
    {
            *bytes = tx_idle;                                   // Yes, return flags
            return 0;
    }
}
bytecnt = (usRemBytes >= 2) ? 2 : usRemBytes;                   // Set return byte count
rb = (unsigned char *)bytes;                                    // Set return byte ptr
*(rb+1) = *pTxByte++;                                           // Return 1st byte if( bytecnt == 2 )
    *rb = *pTxByte++;                                           // Return 2nd byte
usRemBytes -= bytecnt;                                          // Count down remaining bytes
pSupeComStruct->usTxIntvlBytes += bytecnt;                      // Update Shared RAM stats
pSupeComStruct->usTxProcCnt += bytecnt;

return bytecnt;                                                 // and return byte count delivered
}
//*****************************************************************************
//
// Function:   getbits_s( UINT32 BitArray[2] )
// Usage: This function is used to obtain the next 64 bits of Tx data for
//              tranmit encoding. The data is returned as two 32-bit unsigned
//              integers, at a location provided as the only parameter. No
//              other signals or values are returned.
//              Data is encoded with appropriate HDLC zero-insertion logic
//              before insertion into the 64-bit array. If Tx data is not
//              available, then the array is padded from the end of valid data
//              to the end of the buffer with 'flag' octets (0x7e).
//              Valid data is ordered as follows:
//              The first valid bits are inserted into the LSByte of the first
//              word in the provided two-word array. The next encoded byte of
//              data is inserted immediately to the left of the previous bits
//              in the same first word. When the first word has been filled
//              with bits, from right to left, the residual of any bits that
//              did not fit in the first word are inserted in the LSByte of the
//              second word. Additional bits are inserted immediately to the
//              left of the previous bits in the same second word. When the
//              second word has been filled with bits, the function retains
//              any residual for subsequent calls, and returns to the caller.
//
//*****************************************************************************
```

FIG. 6c

```
static void getbits_s( uint32 BitArray[] )
{
   uint32 Acc, Data, BitData, avail_bits;
   uint16 DataLen, NewData, 1;

i = 0;                                          // Set BitArray index to 1st word
   do                                              // Do the following block until the
   {                                               // BitArray index exceeds the 2nd word
      avail_bits = 32 - resid_size;                // Determine available bits remaining in
                                                   // current word
      if ( BitCnt >= 8 )                           // If at least 8 bits in test sample,
      {                                            // process existing sample
         BitData = BitResid;                       // Set current bit data to bit residual
         DataLen = xTbl[BitData&0x00ff] & 0x0f;    // Get width count for field
         Data = _extu(BitData,32-DataLen,32-DataLen); // Extract field to copy
         BitCnt -= DataLen;                        // Reduce resid bit count
         BitResid = BitData >> DataLen;            // and save residual bits
         DataLen += (xTbl[BitData & 0x00ff] >> 7); // Adjust for zero-insert
      }
      else // If less than 8 bits remain in current sample, attempt to get 8 or 16 more bits.
      {
         if( (DataLen = 8 * GetTxBytes(&NewData)) > 0 )  // Test ret count
         {  // Yes, determine 0-bit stuffing locations
            BitResid = (NewData << BitCnt) | BitResid;   // Construct new sample & length
            BitCnt += DataLen;
            continue;                              // Exit back to outer loop
         }
         else
         {  // For End-of-Frame, empty out residual bits to prepare for flags
            if( BitCnt >= 5 )                      // First, clear out remaining data
            {
              DataLen = xTbl[BitData&0xff] & 0x0f; // Extract max length
              if( DataLen > BitCnt )               // If length is gt residual, use residual
length
                 DataLen = BitCnt;
              Data = _extu(BitData,32-DataLen,32-DataLen); // Get data
              BitCnt -= DataLen;                   // Adj residual bit count
              BitResid = BitData >> DataLen;       // Set new residual data
              DataLen += (xTbl[BitData&0xff] >> 7); // Adj for zero insrt Acc = (Data << resid_size) | resid_data; // Position output accumulator reg
              if( avail_bits > DataLen )           // Did new data fit in 32 bits?
              {
                 resid_data = Acc;                 // Yes, update output register and its size
                 resid_size += DataLen;
              }
              else
              {
                 BitArray(i++) = Acc;              // No, output 32 bits to caller
                 resid_data = Data >> avail_bits;  // Setup residual data and size
                 resid_size = DataLen - avail_bits;
                 if( i > 1 )                       // If this was the 2nd word,
                    return;                        // return to caller here
              }
            }// End of (BitCnt >= 5)

// Remaining bit count must be less than 5 at this point
            if( BitCnt > 0 )                       // Test if any bits remaining
            {
               Data = BitResid;                    // Yes, setup to insert it
               DataLen = BitCnt;
               BitResid = BitCnt = 0;
            }
            else
            {                                      //No residual bits,and no circular buffer data
               Data = 0x7e7e7e7e;                  // Set data to HDLC flags
               DataLen = 32;
            }
         }// End of (GetTxBytes == 0)
      }// End of (BitCnt < 8)

Acc = (Data<<resid_size)| esid_data; //Shift data bits left sufficiently to be to the left of
                                           //residual data
                                           // then "or" data with residual
      if( avail_bits > DataLen )           // Test if available bit space was greater than
                                           //the inserted field.
      {
         resid_data = Acc;//If so,copy accumulated bits to residual data area, and update size.
         resid_size += DataLen;
      }
      else
      {
         BitArray(i++) = Acc;              // Else, place accumulated value into output array and
                                           //update array index.
```

FIG. 6d

```
            resid_data = Data >> avail_bits;   // Set residual data to high-order data split bits, and
            resid_size = DataLen - avail_bits; // their bit count in residual size,
                                               // which may be zero.
        }
    }while( i < 2 );                           // Test if output array yet filled. No, loop back
    return;                                    // Yes, return to caller.
}
//**********************************************************************
//
// Function:      getbits_a( UINT32 BitArray[2]
// Usage: This function is used to obtain the next 64 bits of Tx data for
//                transmit encoding. The data is returned as two 32-bit unsigned
//                integers, at a location provided as the only parameter. No
//                other signals or values are returned.
//                Data is encoded with appropriate framing bits before insertion
//                into the 64-bit array. If Tx data is not available, then the
//                array is padded from the end of valid data to the end of the
//                buffer with MARK bits (one-bits).
//                Valid data is ordered as follows:
//                The first valid bits are inserted into the LSByte of the first
//                word in the provided two-word array. The next encoded byte of
//                data is inserted immediately to the left of the previous bits
//                in the same first word. When the first word has been filled
//                with bits, from right to left, the residual of any bits that
//                did not fit in the first word are inserted in the LSByte of the
//                second word. Additional bits are inserted immediately to the
//                left of the previous bits in the same second word. When the
//                second word has been filled with bits, the function retains
//                any residual for subsequent calls, and returns to the caller
//
//**********************************************************************
void getbits_a( uint32 BitArray[] )
{
    uint32 Acc, Data;
    int16 NewData, ByteCnt, DataLen, i;
    int16 avail_bits;

i = 0;                                      // Set BitArray index to 1st word
    do                                          // Do the following block until the
    {                                           // BitArray index exceeds the 2nd word
        DataLen = Data = 0;
        if( (avail_bits = 32 - resid_size) > 0 )   // Determine available bits remaining in
                                                   // current word
        {
                                                // Get more data bytes (0, 1 or 2) from
                                                //circular buffer.
            if( (ByteCnt = GetTxBytes(&NewData)) > 0 ) // Test for zero.
            {
                Data =_extu(NewData,24,23) | 0x0200;  // For valid data, shift byte left 1 bit
                                                      // to create a 0
                                                      //start-bit,
                DataLen = 10;                         // and or in a 1 stop-bit on LSByte
                if( ByteCnt == 2 )                    // Test if two bytes obtained from buffer
                {                                     // Yes, extract it and also add
                                                      //Start/Stop bits.
                    Data = ((NewData & 0xff00) << 1) | 0x0008000 | Data;
                    DataLen = 20;                     // Set width according to bytes parsed
                }
            }
            else
            {                                         // If 0 bytes obtained, set data to MARKs only
                DataLen = 16;                         // with width of two octets
                data = 0xffff;
            }
        }
        Acc = Data << resid_size | resid_data;  // Shift data bits left sufficiently to be
                                                //to the left of
                                                // residual data, then "or" data with residual.

if( avail_bits > DataLen )              // Test if available bit space was greater
                                                //than the inserted field.
        {
            resid_data = Acc;                   // If so, copy accumulated bits to residual data area, and
                                                //update size.
            resid_size += DataLen;
        }
        else
        {
            BitArray(i++) = Acc;                // Else, place accumulated value into output array and
                                                //update array index.
            resid_data = Data >> avail_bits;    // set residual data to high-order data split bits, and
            resid_size = DataLen - avail_bits;  // their bit count in residualsize.
        }
    } while( i < 2 );                           // Test if output array yet filled. No, loop back
```

FIG. 6e

```
    return;                                 // Yes, return to caller.
}
//*****************************************************************
//
// Function:    get 64 bits
// Usage: This is the externally referenced function to obtain the next
//              64 bits of output modem bit-stream. It vectors into one of
//              the above two bits functions, dependent upon the data mode.
//
//*****************************************************************
void get 64 bits( uint32 BitArray[] )
{
        if( TxClamp )
                txd_vect( BitArray );
}
```

FIG. 6f

```
# include "defs.h"
# include "struc.h"
# include "dsp_api.h"

void putbits_s( uint32, uint32[] );
void putbits_a( uint32, uint32[] );
extern PFNRXPUT Rx_vect;

static unsigned long BitResid = 0;
static unsigned long RxLong = 0;
static uint32 RxWord = 0;
static uint32 RxBits = 0;
static uint32 BitCnt = 0;
static uint32 RxIndx = 0;
static uint32 RxHdr = (RX_SOF << 16);
static uint32 RxBlk[33]);
/**************************************************************/
/*                                                            */
/* Calling Sequence:                                          */
/*                                                            */
/*   void putRxData( unsigned int nBits, unsigned int rxbits[] ) */
/*                                                            */
/**************************************************************/
void putRxData( unsigned int nBits, unsigned int *pRxBits )
{
        Rx_vect(nBits,pRxBits);

return;                          // and return here.
}
/**************************************************************/
/*                                                            */
/* Calling Sequence:                                          */
/*                                                            */
/*   void PutRxWord( unsigned int RxWord )                    */
/*                                                            */
/* Function:                                                  */
/*                                                            */
/*   Takes the collected "RxWord" value and adds it to the current */
/*   Rx buffer block. If the addition of the word causes the block */
/*   to reach its maximum size, a block header is generated, and */
/*   both the header and the block are moved into the Shared RAM Rx */
/*   circular buffer, with the appropriate updates to the RxHead */
/*   value.                                                   */
/*                                                            */
/**************************************************************/
static void PutRxWord( unsigned int RxWord )
{
    RxBlk[1 + RxIndx++] = RxWord;
    if( RxIndx < 32 )
        return;

RxBlk[0] = RxHdr | (RxIndx * 4);    // Load the RxBlk into the circular buffer (if space
                                         //permits)
    LoadRxBuf (RxBlk) ;
    RxHdr = 0;                           // Clear the Hdr for next block
    RxIndx = 0;                          // Clear word index to the block return;
}
```

FIG. 7a

```
/******************************************************************************/
/*                                                                            */
/* Calling Sequence:                                                          */
/*                                                                            */
/*   void PutRxEOF ( unsigned int RxWord, unsigned int ByteCnt)               */
/*                                                                            */
/* Function:                                                                  */
/*   This function is called when a Rx Block is to be truncated with          */
/*   the current data byte, in RxWord, made the last bytes in the             */
/*   block. The number of data bytes in RxWord is provided in the             */
/*   ByteCnt parameter. The function sets the appropriate Header              */
/*   flags, and causes the block to be written to the Rx circular             */
/*   buffer. It then prepares for the next block by loading the               */
/*   header with Start-of-Frame flag, and zeroing the length.                 */
/*                                                                            */
/******************************************************************************/
static void PutRxEOF(unsigned int RxWord, unsigned int ByteCnt)
{
    if( !ByteCnt && !RxIndx )
        return;

if( ByteCnt )
        RxBlk[1+ RxIndx] = RxWord;

RxHdr |= (RX_EOF << 16) ;
    RxBlk[0] = RxHdr | ((RxIndx * 4) + ByteCnt) ;
    LoadRxBuf(RxBlk);
    RxHdr = (RX_SOF << 16);
    RxIndx = 0;

return;
}
/******************************************************************************/
/*                                                                            */
/* Calling Sequence:                                                          */
/*                                                                            */
/*   void putbits_a( unsigned int nBits, unsigned int rxbits[] )              */
/*                                                                            */
/* Function:                                                                  */
/*                                                                            */
/*   Assume bit stream, as found in current BitResid, for BitCnt bits         */
/*   plus subsequent bits as defined by nBits in rxbits, are formatted        */
/*   as 10-bit bytes with a 0-bit as Start bit and a 1-bit as a               */
/*   Stop bit, and 8-bits of data between. Proceed accordingly until          */
/*   an expected Start or Stop bit is not of the correct value, or            */
/*   until end of data, or until MARKs are again located.                     */
/*                                                                            */
/******************************************************************************/
void putbits_a( uint32 nBits, uint32 *pRxBits )
{
    unsigned long NewBits;
    uint32 Data, NewBitCnt, MARKs;
    uint8 byte;

MARKs = 0;                              // Start with a clean slate (for now)
    while( nBits > 0 )                      // Loop while bits available,
    {                                       // When BitCnt < 9, attempt to get more bits
                                            //from input array
        NewBits = *pRxBits++;               // Yes, get next input word from array
        NewBitCnt = (nBits > 32) ? 32 : nBits;  // Determine length BitResid = (NewBits << BitCnt) | BitResid;  // Prepend to BitResid and
                                                    //perform necessary accounting
        BitCnt += NewBitCnt;
        nBits -= NewBitCnt;

while( BitCnt >= 9)                 // Test if at least 9 bits in BitResid
        {
            if( BitResid & 1 )              // Test LSB for Invalid Start bit (0)
            {
                BitResid >>= 1;             // Yes,Invalid Start-bit, shift all bits
                                            //right 1 position,
                BitCnt--;                   // account for discarded bit, and continue scan
                if ( --MARKs >= 8 )         // Test if full byte of MARK found
                {
                    RxWord <<= (32 - RxBits);
                    PutRxEOF (RxWord, RxBits/8);
                    RxWord = RxBits = MARKs = 0;
                }
            }
            else                            // If correct, extract data 8-bits, and
                                            //add to output
            {
                MARKs = 0;                  // Reset MARK ctr
```

FIG. 7b

```
            Data = BitResid;                          // byte register (RxLong)
            byte = _extu (Data, 23, 24) ;
            RxWord = (RxWord << 8) | byte;            // Do byte reversal
            RxBits += 8;
            if( RxBits >= 32 )                        // When RxWord has a full word write it to
                                                      //the Rx circular buffer.
            {
                PutRxWord(RxWord);
                RxWord = RxBits = 0;
            }
            BitResid >>= 9;                           // Then remove 9 bits from the BitResid register
            BitCnt -= 9;
        }
    }// End of while( BitCnt >= 9 )
)                                                     // Loop back on outer loop if bits available.
//else
return;                                               // Return to caller
}
```

FIG. 7c

```
/******************************************************************************/
/*                                                                            */
/*.Calling Sequence:                                                          */
/*                                                                            */
/*   void putbits_s( unsigned int nBits, unsigned int rxbits[] )              */
/*                                                                            */
/* Function:                                                                  */
/*                                                                            */
/*   Assume bit stream, as found in current BitResid, for BitCnt bits         */
/*   plus subsequent bits as defined by nBits in rxbits, are format-          */
/*   ted as HDLC bytes with a 0-bit inserted after each consecutive           */
/*   5 1-bits, except for inserted Flags or MARKs. Proceed                    */
/*   accordingly until an unknown bit pattern is found, or                    */
/*   until end of data, or until MARKs are again located.                     */
/*                                                                            */
/******************************************************************************/
const uint8 RxTbl[256] =
{
        //   00   01   02   03   04   05   06   07   08   09   0a   0b   0c   0d   0e   0f
        /*0x*/ 0x07,0x07,0x07,0x07,0x07,0x07,0x07,0x07,0x07,0x07,0x07,0x07,0x07,0x07,0x07,0x07,
        /*1x*/ 0x07,0x07,0x07,0x07,0x07,0x07,0x07,0x07,0x07,0x07,0x07,0x07,0x07,0x07,0x07,0x85,
        /*2x*/ 0x07,0x07,0x07,0x07,0x07,0x07,0x07,0x07,0x07,0x07,0x07,0x07,0x07,0x07,0x07,0x07,
        /*3x*/ 0x07,0x07,0x07,0x07,0x07,0x07,0x07,0x07,0x07,0x07,0x07,0x07,0x07,0x07,0x86,0xf9,
        /*4x*/ 0x07,0x07,0x07,0x07,0x07,0x07,0x07,0x07,0x07,0x07,0x07,0x07,0x07,0x07,0x07,0x07,
        /*5x*/ 0x07,0x07,0x07,0x07,0x07,0x07,0x07,0x07,0x07,0x07,0x07,0x07,0x07,0x07,0x07,0x85,
        /*6x*/ 0x07,0x07,0x07,0x07,0x07,0x07,0x07,0x07,0x07,0x07,0x07,0x07,0x07,0x07,0x07,0x07,
        /*7x*/ 0x07,0x07,0x07,0x07,0x07,0x07,0x07,0x07,0x07,0x07,0x07,0x07,0x07,0x87,0x87,0x86,0xf9,
        /*8x*/ 0x06,0x06,0x06,0x06,0x06,0x06,0x06,0x06,0x06,0x06,0x06,0x06,0x06,0x06,0x06,0x06,
        /*9x*/ 0x06,0x06,0x06,0x06,0x06,0x06,0x06,0x06,0x06,0x06,0x06,0x06,0x06,0x06,0x06,0x85
        /*ax*/ 0x06,0x06,0x06,0x06,0x06,0x06,0x06,0x06,0x06,0x06,0x06,0x06,0x06,0x06,0x06,0x07,
        /*bx*/ 0x06,0x06,0x06,0x06,0x06,0x06,0x06,0x06,0x06,0x06,0x06,0x06,0x06,0x06,0xf9,0xff,
        /*cx*/ 0x05,0x05,0x05,0x05,0x05,0x05,0x05,0x05,0x05,0x05,0x05,0x05,0x05,0x05,0x05,0x35,
        /*dx*/ 0x05,0x05,0x05,0x05,0x03,0x05,0x05,0x05,0x05,0x05,0x05,0x05,0x05,0x05,0x05,0x85
        /*ex*/ 0x04,0x04,0x04,0x04,0x04,0x04,0x04,0x04,0x04,0x04,0x04,0x04,0x04,0x04,0x04,0x04,
        /*fx*/ 0x03,0x03,0x03,0x03,0x03,0x03,0x03,0x03,0x02,0x02,0x02,0x02,0x01,0X01,0xff,0xff
};
```

FIG. 7d

```
void putbits_s( uint32 nBits, uint32 *pRxBits )
{
    unsigned long NewBits;
    uint32 Data, DataLen, NewBitCnt, RxWord, Temp;

while( nBits > 0 )                          // Test if sufficient bits to proceed with parse
    {                                            // Yes, add 32-bits data to examination register (BitResid)
        NewBits = *pRxBits++;                    // its valid bit count
        NewBitCnt = (nBits > 32) ? 32 : nBits;   // Then add bits to our input bit
                                                 //exam register
        BitResid = (NewBits << BitCnt) | BitResid; // and account for the transfer.
        BitCnt += NewBitCnt;
        nBits -= NewBitCnt;
        while( BitCnt >= 8 )
        {
            Data = BitResid & 0xff;              // Extract 8 LSBs if( (DataLen = RxTbl[Data] & 0x0f) <= 8 )   // Test if translated data has special
                                                         //length flag
            {                                            // No, process bit field
                if( RxTbl[Data] & 0x80 )                 // If here, then we have a valid bit
                                                         //group to move to
                {                                        // output collection registers.
                    BitResid >>= (DataLen + 1) ;         // Test if need to collapse an inserted
                    0-bit.
                    BitCnt -= (DataLen + 1);             // If so, shift one extra bit to the
                                                         //right.
                }
                else
                {
                    BitResid >>= DataLen;                // If not, merely remove bit
                    BitCnt -= DataLen;                   // group from input stream
                }
                NewBits= extu (Data, 32-DataLen, 32-DataLen); // Extract bits from test byte,
                                                              // and insert into output register
                RxLong = (NewBits << RxBits) | RxLong ;
                RxBits = DataLen;

If( RxBits >= 32 )                        // Test if 32-bits
                accumulated
                {
                    Temp = RxLong & 0x00ffffff;           //   Yes, extract 32 bits
                    RxWord = Temp << 24 | ((Temp << 8 & 0x00ff0000)
                                          | ((Temp >> 8 & 0x0000ff00)
                                          | (Temp >>24);
                    PutRxWord (RxWord) ;                  // Send to the Rx circular buffer.
                    RxLong >>= 32;                        // Account for sent bits in output register.
                    RxBits -= 32;
                }
            } // End of (DataLen <= 8)
            else                                           // DataLen > 8
            {                                              // Special cases follow:
                                                           // For 0x3f, 0x7e, 0xbf - (6 1-bits) Force EOF
                                                           // For 0x7f, 0xfe, 0xff - (7 1-bits) Frame Abort -
                                                           // recover by finding next 0-bit in input stream
                if( DataLen == 9 )
                {                                          // Yes, force End-of-Frame
                    Temp = RxLong & 0x00ffffff;
                    RxWord = 0;
                    if( RxBits >= 8 )
                        RxWord |= (Temp << 24);
                    if( RxBits >= 16)
                        RxWord |= ((Temp << 8) & 0X00ff0000);
                    if( RxBits >= 24)
                        RxWord |= ((Temp >> 8) & 0x0000ff00);
                    if( RxBits >= 32)
                        RxWord l= (Temp >> 24);
                    if( RxBits % 8 )                       // Test for alignment
                        RxHdr |= (RX_FCS_ERROR << 16) ;

PutRxEOF(RxWord,RxBits/8);             // Send residual bytes
                    RxLong = RxBits = 0;                   // and clear collection regs
                    if( Data == 0x7e )
                    {
                        BitResid >>= 8;                    // Clear Flag from input bits
                        BitCnt -= 8;
                    }
                    else
                    {
                        BitResid >>= 7;                    /
                        BitCnt -= 7;
                    }
                    continue;                              // and continue scan
```

FIG. 7e

```
            }
        else                                     // 0x7f, 0x7e, 0xff
        {                                        // (DataLen > 8) && !EOF ==> Frame abort
            RxIndx = 0;                          // Yes, clear knowledge of any Frame
            if( (RxHdr>>16) != RX_SOF )                  // Test if blk is SOF
            {
                RxHdr |= (RX_ABORT_FRAME << 16) ;    // No, send Hdr
                PutRxEOF(RxWord,0);                  // with Frame Abort flag
                RxHdr = (RX_SOF << 16);              // and reset Hdr with SOF
            }
            BitResid >>= 7;                      // Find next Start bit (0)
            BitCnt -= 7;                         // Clear out 7-bit field
                                                 // Before scanning for 0-bit
            while( BitCnt > 0 )
            {
                if( !(BitResid   ) & 1)              // Test for LSB of zero
                    break;
                BitCnt--;
                BitResid >>= 1;                      // If not, shift right 1 bit
            }
        }// End of Frame Abort
    }// End of (DataLen >8)
  }// End while( BitCnt >= 8)
}// End of while( nBits > 0 )

return;
}
```

FIG. 7f

OPTIMIZED HIGH-LEVEL DATA LINK CONTROL ENCODING/DECODING

A portion of the disclosure of this patent document contains material, which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

A. Field of the Invention

The present invention relates to the field of data communications, and more particularly to the field of encoding and decoding data in a communications system.

B. Description of the Related Art

Data may be communicated between two data communications systems serially as a stream of bits, or a bitstream. A sending data communications station may receive data in units, such as 8-bit octets (or bytes), or as 16-bit or other multiple bit data unit. The bytes are arranged end-to-end and transmitted one bit at a time on a transmission medium, such as a wire or the atmosphere, to a receiving data communications station. The receiving data communications station receives the bitstream one bit at a time and attempts to recover the original data units.

During transmission, bits may have been added or subtracted from the bitstream. In order to detect and correct errors, the transmitting station may arrange the data units in discrete frames and compute a checksum for each frame. The checksum is then added to the frame before transmission. When the frames arrive at the receiving station, the checksum is recomputed. If it is different than the one contained in the frame, a transmission error is indicated.

Different methods have been devised for framing bitstreams and for extracting the frames at the receiving end. One popular method is known in the industry as the High-Level Data Link layer Control (HDLC) protocol. The HDLC protocol identifies a frame structure that may include a frame delimiter, an address field, a control field, a data field, and a checksum. An HDLC encoder arranges the data in frames and outputs the frames serially as the transmitted bitstream.

The bitstream is received at a receiving station that includes an HDLC decoder. The HDLC decoder reconstructs the data that was "framed" by the HDLC encoder by extracting the data from the data field of the frames. The HDLC decoder first identifies the frame by detecting the frame delimiter. The frame delimiter is a predetermined 8-bit value that an HDLC encoder inserts at the beginning of the bitstream to signal the beginning of a frame. The frame delimiter is typically the bit sequence 01111110 in binary.

The HDLC protocol uses bit-stuffing to achieve data transparency, which is the ability to distinguish data patterns from bit patterns used as frame delimiters or other control patterns (also called flags) when the bit patterns are presented as data for insertion in the data field. For example, wherever the bitstream to be transmitted contains a sequence of 5 consecutive '1' bits, the HDLC encoder follows the transmission of those 5 '1' bits with an inserted '0' bit. In order to reconstruct the original data, bit extraction is used by the decoder to remove the '0' bits that were inserted by the encoder.

One problem with HDLC is that it is a bit-oriented protocol. The HDLC encoder analyzes each bit of the data to detect patterns for which a '0' bit must be inserted. In addition, the HDLC decoder analyzes each bit of the data to detect the patterns for which a '0' bit must be removed to reconstruct the original data. While the bit-oriented characteristic of the HDLC protocol may be acceptable for transmission at lower data rates, it becomes a computational burden at higher data rates.

It would be desirable to implement HDLC encoding and decoding without the added burden of processing each bit in the bitstream of the data.

BRIEF DESCRIPTION OF THE DRAWINGS

Presently preferred embodiments of the invention are described below in conjunction with the appended drawing figures, wherein like reference numerals refer to like elements in the various figures, and wherein:

FIGS. 6A–6F is source code of a computer program that may be used to implement a presently preferred embodiment of the method shown in FIG. 4; and FIGS. 7A–7F is source code of a computer program that may be used to implement a presently preferred embodiment of the method shown in FIG. 5.

DETAILED DESCRIPTION OF THE PRESENTLY PREFERRED EMBODIMENT

An optimized decoder is provided in which a stream of bits for data having data width w-bits to be transmitted to a receiving station is input into an N-bit register, where N>w. The first w bits to be transmitted is used as an index into a table of all $2^w$ possible values of the octets to determine the number of bits that are to be output and to determine if a zero bit is to be inserted into the output bitstream. The number of bits are output to the output bitstream, a zero is inserted if necessary and the bits in the N-bit register are shifted over such that the next w bits to be transmitted form the index octet.

An optimized decoder is provided in which the input bit stream is moved into an N-bit register, where N>w. The w earliest received bits in the register are used as an index into a table of all $2^w$ possible values of the octets to determine the number of bits to extract from the input stream and to determine whether a zero needs to be deleted.

Figure 1:
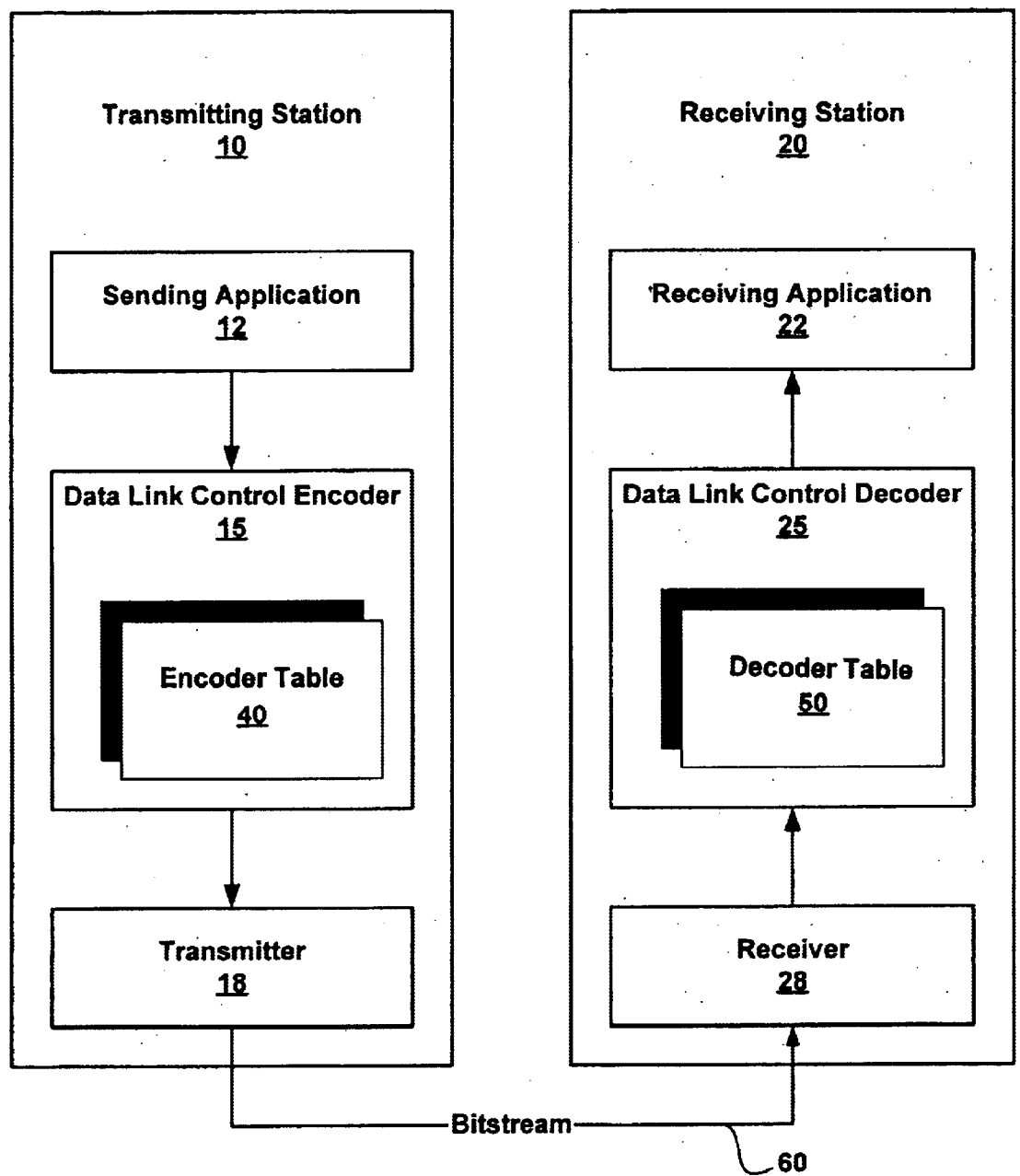
FIG. 1 is a block diagram of a data communication system of the type in which embodiments of the present invention find advantageous use.

FIG. 1 is a block diagram of a data communication system 5 showing a first station 10 transmitting data to a second station 20 in accordance with a preferred embodiment of the present invention. The first station 10 and second station 20 may include any computing system having serial communications resources, such as a mainframe computer, a personal computer, and any device having computing and communications resources (e.g. a computer controlled gas pump, an elevator controller, a data terminal etc.). The system 5 in FIG. 1 shows a sending application 12 in the first station 10 sending data to a receiving application 22 in the second station 20. The sending and receiving applications 12, 22 may include any computer applications that exchange data, such as a browser and a web page on a World-Wide Web server, a terminal application (control software in a terminal) and a communications application, etc. One of ordinary skill in the art will appreciate that the type of stations 10, 20 and applications 12, 22 used in the system 5 is not important to the invention.

The sending application 12 in the first (or transmitting) station 10 couples data to be sent to the second (or receiving) station 20 to a data link control encoder 15. The data may be of any data width of w-bits, (e.g. 8-bit, 16-bit, 32-bit, etc.), however, for simplicity, 8-bit data units will be assumed. The data link control encoder 15 frames and encodes the data in accordance with HDLC principles by processing the data n-bits, where n>1 at a time. The advantage of processing the data more than one bit at a time is that the encoding step is made less computationally intensive making data transmission more efficient.

In a preferred embodiment, the data link control encoder 15 includes an encoder table 40 to perform the multiple bit analysis of the data. The encoder table 40 includes $2^w$ entries for data having a data width of w-bits. Therefore, if the data is w=8-bits wide, the table includes 256 entries. Each entry may include a bit-copy number to indicate the number of bits to copy from the 8-bit value being analyzed to the bitstream and a stuffing indicator to indicate whether a '0' bit stuffing is required. In a preferred embodiment of the present invention, the bit-copy number and the stuffing indicator in the table refer to the w-bit value that may be used as an index into the table 40.

The encoder 15 sends the number of bits indicated in the table to a frame as defined by the HDLC protocol. The frame is then sent to a transmitter 18. The transmitter 18 outputs a series of frames as a bitstream over a transmission medium 60 to the receiving station 20. The receiving station 20 includes a receiver 28 that receives the bitstream and sends the bitstream to a data link control decoder 25. The data link control decoder 25 processes the bitstream by detecting frame delimiters and the data field of the frame as described in the HDLC protocol.

One advantage of the data link encoder 15 described with reference to FIG. 1 is that it generates HDLC encoded bitstreams. One of ordinary skill in the art will appreciate that the bitstream output by the transmitting station 10 may be processed by any receiving station, such as the receiving station 20, that uses the HDLC protocol.

In a preferred embodiment, the data link control decoder 25 processes the data in the data field a multiple bit number at a time using a decoder table 50. For w-bit data, the table 50 includes $2^w$ entries. Each entry may include a special pattern indicator, a bit-copy number and a stuffed bit detector for each value that may be used as an index to that entry. The special pattern indicator identifies the w-bit number used as an index into the table 50 as a special bit pattern, such as the flag delimiter, a single 0-bit followed by six 1 bits, or 0x7E, or a frame abort 0x7F values for 8-bit data. The decoder 25 sends the indicated number of bits and deletes, or doesn't delete, a '0' as indicated for any given entry.

The bits sent by the decoder 25 are compiled into the data units (e.g. bytes or octets for 8-bit data) and sent to the receiving application 22.

One advantage of the system 5 shown in FIG. 1 is that data is processed multiple bits at a time in the data link encoder 15 and decoder 25. This reduces the computation complexity of the encoder 15 and the decoder 25 leading to an overall increase in throughput.

Another advantage of the encoder 15 and the decoder 25 is that neither is required to communicate with the other. Both generate or receive a bitstream in accordance with the HDLC protocol.

Figure 2:
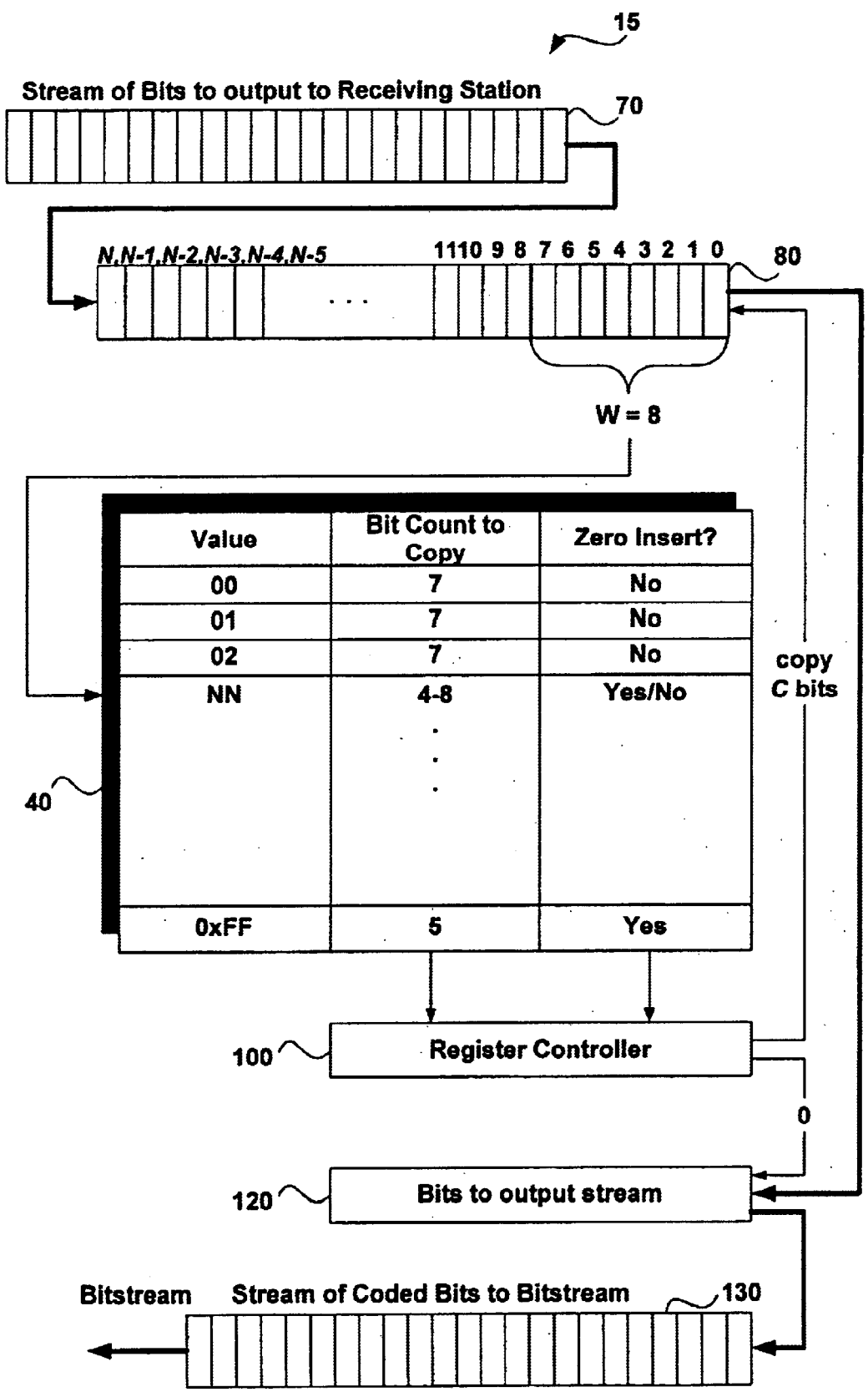
FIG. 2 is a block diagram of an HDLC encoder according to a preferred embodiment of the present invention.

FIG. 2 shows an example of the data link control encoder 15 of FIG. 1 according to a preferred embodiment. The encoder 15 in FIG. 2 performs HDLC encoding for 8-bit data values, or octets. The encoder 15 in FIG. 2 performs the encoding of the data field in an HDLC frame. The encoding of the other fields of the HDLC frame, such as the frame delimiters, control, address and checksum fields are not important to the present invention.

The data link control encoder 15 includes an encoder input buffer 70, an N-bit register 80, the encoder table 40, a register controller 100, a bit output buffer 120 and an output bitstream 130. As octets, each data unit input into the encoder has a value between 0 and 255, or 0xFF. The encoder table 40 includes 256 entries for each of the possible values of the data units. Each entry includes a bit count to send to the bits output buffer 120 and a zero insert indicator that indicates whether a zero insert is required. Table 1 is an example of a table that may be coded in a programming language (see FIG. 6) to perform as the encoder table 40 described below.

The encoder 15 receives 8-bit data elements in an encoder input buffer 70. The data is input into an N-bit register 80, where N>8. The register controller 100 is a program that uses the 8 least significant bits from the N-bit register 80 as an index into the encoder table 40 to interpret its entries. The register controller 100 transfers or copies the number of bits designated in the bit count for the entry, stuffs a zero when a zero insert is indicated in the table, and moves any bits remaining after the zero insert back to the N-bit register 80. One of ordinary skill in the art will appreciate that the 8 most significant bits from the N-bit register 80 may be used and that the N-bit register 80 may be moved in the most significant bit direction.

For values between 00 and 0x1E, all eight bits can be passed to the output bitstream without requiring a zero insert. This is because for those values there are no strings of five or more consecutive '1' bits. In addition, there is no possibility of the need for a zero insert based on any subsequent concatenated bit stream because three of the bits in each value are zeros.

When a 0x1F is received, a series of five consecutive '1' bits is included that requires a zero insert as called for by the HDLC protocol. The register controller 100 may indicate that C=5 bits be extracted from the octet (in the 8 least significant bits of the N-bit register 80) and moved to the bit output buffer 120. The register controller 100 inserts a '0' bit into the bit output buffer 120. The bit output buffer 120 is then transferred to the output bitstream 130 for transmission to the receiving station 20. The N-bit register 80 then shifts the remaining 3 most significant bits to the least significant positions in the N-bit register 80. The shift causes the five more significant bits to follow the three least significant bits to fill the least significant octet in the N-bit register 80.

The register controller 100 then cycles back to examine the least significant octet in the N-bit register 80. The examination proceeds as described above with respect to a value of 0x1F. Some quantity of bits, between 4 and 8 bits, will always be copied to the bit output buffer 120 for transmission on the bitstream 130.

The advantage of the data link control encoder 15 described with reference to FIG. 2 is that it is no longer bit-oriented. Although the protocol specifies how bits are to be processed, embodiments of the present invention permits the analysis and transfer of data in multiple bits.

Figure 3:
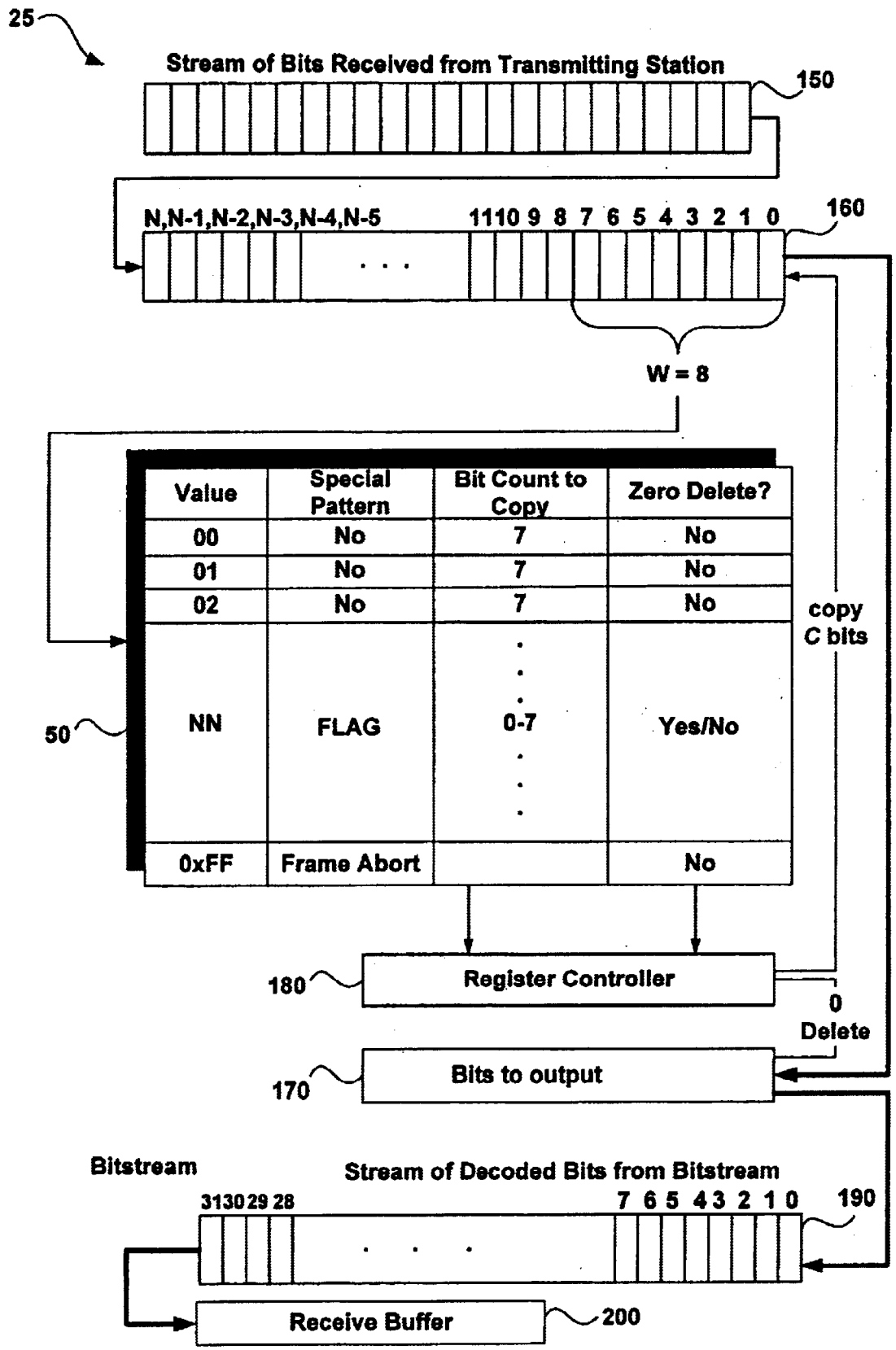
FIG. 3 is a block diagram of an HDLC decoder according to a preferred embodiment of the present invention.

FIG. 3 shows a block diagram of the data link decoder 25 of FIG. 1 according to a preferred embodiment of the present invention. The decoder 25 includes a decoder input buffer 150, an N-bit register 160, the decoder table 50, a decoder register controller 180, a bit input buffer 170, an input bitstream 190 and a receiver buffer 200. The decoder 25 removes any '0' bits that may have been inserted in the encoding process and transfers the original data to the receiving application 22.

The decoder 25 also scans for and processes any special bit patterns. For example, the values 0x3F and 0x7E are flags for byte synchronization according to the HDLC protocol. The value 0x7F is a frame abort flag. When the frame abort flag is received, all bit-stream decoding ceases until another 0-bit is found.

The decoder receives octets in the input bitstream 190 and transfers the bits to the N-bit register 160 as needed. The decoder register controller 180 uses the octet in the least significant 8 places of the N-bit register as an index into the table 50 to examine the entry of the table. The entry is examined to determine if the octet is a special pattern. If it is, then the action indicated by the pattern is performed as called for in the HDLC protocol. The entry into the table 50 also indicates the number of bits to copy to the bit input buffer 170 and whether a '0' bit should be deleted. The bit input buffer is transferred into the input bit stream 190 as an octet and stored in the receive buffer 200. Table 2 shows a decoder table 50 that may be used to perform the decoding functions described above.

The register controller 180 copies the number of bits indicated in the table when bit copying is indicated. The number of bits copied is the maximum possible while still leaving a 0-bit as the first least significant bit in the subsequent scan iteration.

The advantage of the decoder 25 in FIG. 3 is that it processes the data in multiple bits to reduce the computational burden on the communications resources of the receiving station 20. In addition, the decoder 25 will operate on any HDLC encoded input bit stream. It need not have been encoded by the encoder 15 described above.

TABLE 1

| Value (Range) | Bit Count to Copy | Zero-Insert- |
|---|---|---|
| 00–1E | 8 | No |
| 1F | 5 | Yes |
| 20–3D | 8 | No |
| 3E | 6 | Yes |
| 3F | 5 | Yes |
| 40–5E | 8 | No |
| 5F | 5 | Yes |
| 60–7B | 8 | No |
| 7C–7D | 7 | Yes |
| 7E | 6 | Yes |
| 7F | 5 | Yes |
| 80–9E | 7 | No |
| 9F | 5 | Yes |
| A0–BD | 7 | No |
| BE | 6 | Yes |
| BF | 5 | Yes |
| C0–DE | 6 | No |
| DF | 5 | Yes |
| E0–EF | 5 | No |

TABLE 1-continued

| Value (Range) | Bit Count to Copy | Zero-Insert- |
|---|---|---|
| F0–F7 | 4 | No |
| F8–FB | 8 | Yes |
| FC–FD | 7 | Yes |
| FE | 6 | Yes |
| FF | 5 | Yes |

| Value (Range) | Special Pattern | Bit Count to Copy | Zero-Delete |
|---|---|---|---|
| 00–1E | No | 7 | No |
| 1F | No | 5 | Yes |
| 20–3D | No | 7 | No |
| 3E | No | 6 | Yes |
| 3F | FLAG | 0 | No |
| 40–5E | No | 7 | No |
| 5F | No | 5 | Yes |
| 60–7B | No | 7 | No |
| 7C–7D | No | 7 | Yes |
| 7E | FLAG | 0 | No |
| 7F | Frame Abort | 0 | No |
| 80–9E | No | 6 | No |
| 9F | No | 5 | Yes |
| A0–BD | No | 6 | No |
| BE | No | 6 | Yes |
| BF | FLAG | 0 | No |
| C0–DE | No | 5 | No |
| DF | No | 5 | Yes |
| E0–EF | No | 4 | No |
| F0–F7 | No | 3 | No |
| F8–FB | No | 2 | No |
| FC–FD | No | 1 | No |
| FE–FF | Frame Abort | 0 | No |

Figure 4:
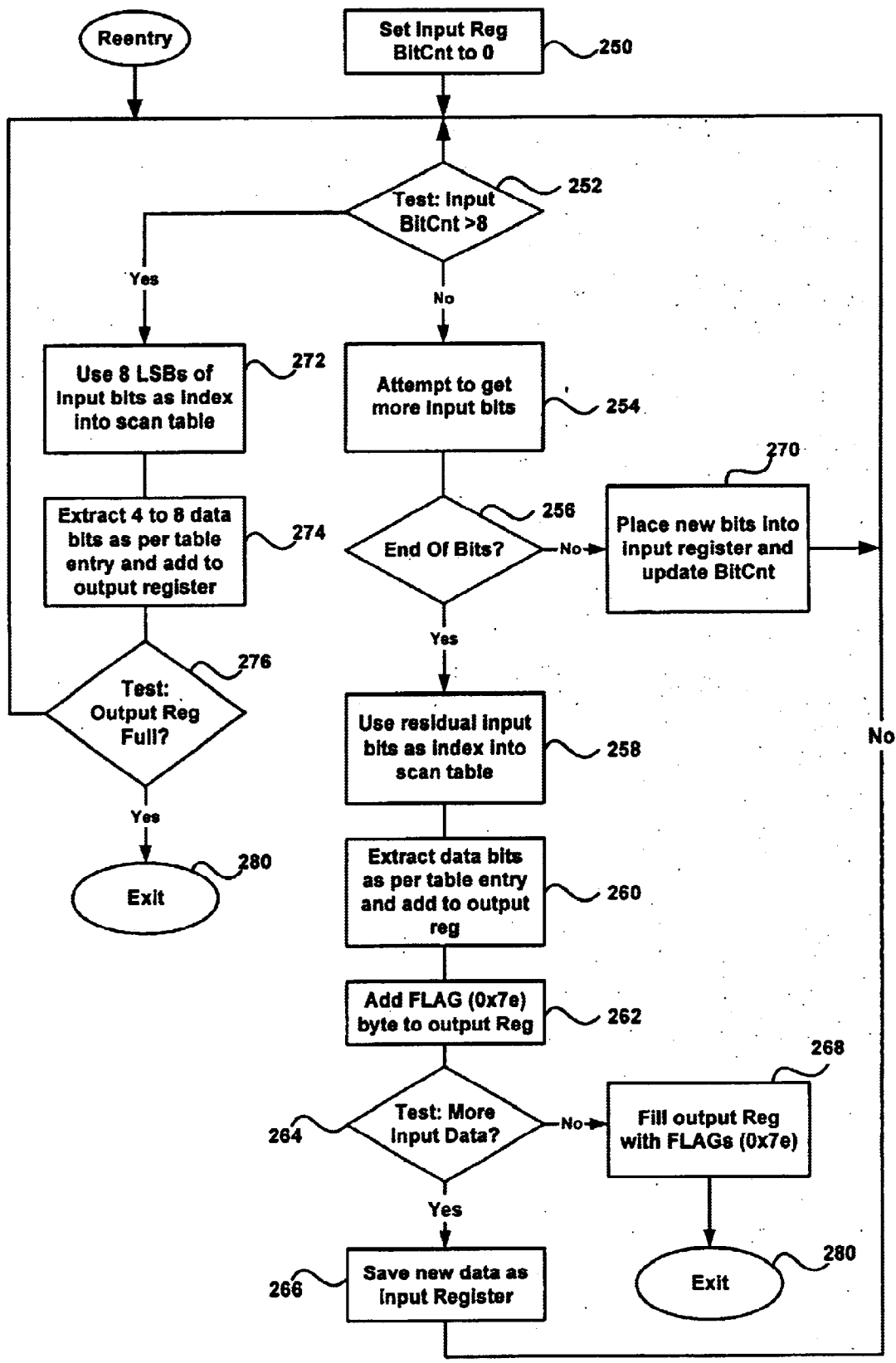
FIG. 4 is a flowchart of a method for performing HDLC encoding according to a preferred embodiment of the present invention.

Figure 4 is a flowchart showing a method for performing an optimized data encoding of HDLC according to a preferred embodiment. The method illustrated in FIG. 4 may be performed using the encoder 15 shown in FIG. 1. The computer programs in FIGS. 6A–6F include functions that may be used to implement the methods illustrated in FIG. 4.

The encoder begins at step 250 by setting an input register bit count to 0. The input register bit count may be used by the register controller 100 in FIG. 2 to track the number of bits needed to complete the least significant octet in N-bit register 80. At decision step 252, the input bit count is tested to determine if it has reached the value 8. If the input bit count is not greater than 8, an attempt is made to shift more bits into the least significant octet at step 254. At decision 256, the input stream is checked to determine if the end of the bits has been reached. If the end of the bits has been reached, the remaining bits are used as an index into the encode table 40 at step 258. At step 260, the number of bits specified by the table entry are moved to the output register, or the output bit buffer. Because this is the end of the bits, a flag of 0x7E is added to the output register at step 262.

At decision 264, the input bit stream to the encoder is tested to determine whether there is any more input data. If there is more input data, the new data is saved in the input register at step 266 and the process is repeated from decisions step 252. If at decision 264, it is determined that there is no longer any more input data, the output register is filled with flags having a value 0x7E as shown at 268 and the encoding method exits at step 280.

If at decision 256, the end of the bits in the input register has not been reached, new bits are added and the bit count is updated as shown at step 270. The process the continues with condition 252 to determine whether the input bit count is greater than 8. If the input bit count is greater than 8 at condition 252, the least significant octet of the end bit register is used as an index into the scan table as shown as step 272. The 4 to 8 bits indicated in the entry at the index in the table are moved to the output buffer at step 274. The output register is tested to determine if it is full at decision 276. If it is full, the encoding method exits at step 280. Otherwise, processing returns to decision 252 to determine if the input bit count is greater than 8.

The method shown in FIG. 4 is performed as long as there is data in the input bit stream.

Figure 5:
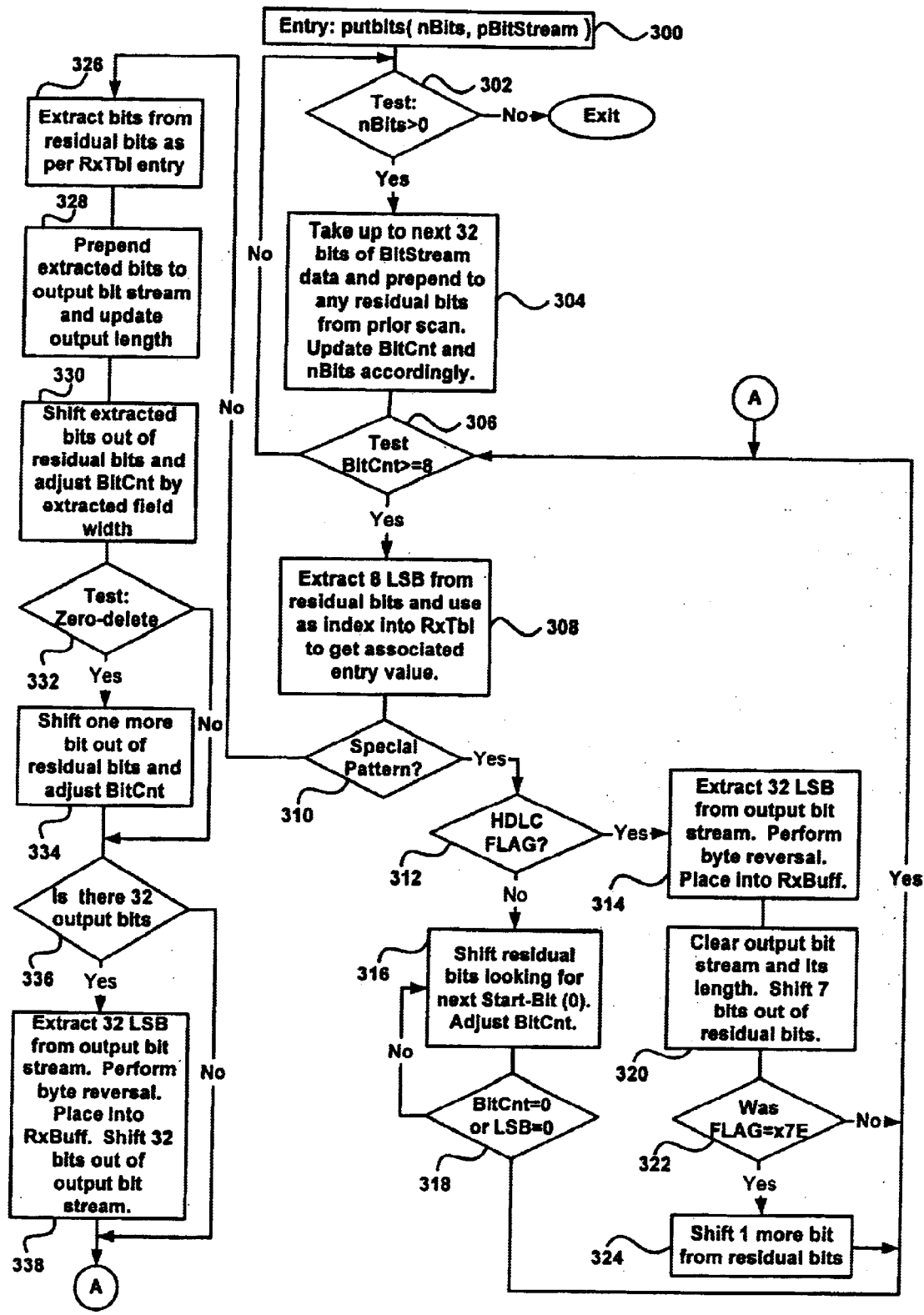
FIG. 5 is a flowchart of a method for performing HDLC decoding according to a preferred embodiment of the present invention.

FIG. 5 is a flowchart showing a method for performing HDLC decoding according to a preferred embodiment of the present invention. FIGS. 7a–7f includes computer programs that may be used to implement the methods shown in the flowchart of FIG. 5.

The decoding method shown in FIG. 5 begins at step 300 with an entry to a program that begins by testing whether there are any bits to process at decision 302. If the number bits is 0, the method immediately exits. Otherwise, up to 32 bits of the bit stream data received at the receiver 28 (shown in FIG. 1) is shifted into the end bit register 160 (shown in FIG. 3, where N=32). The bits shifted into the 32-bit register 160 may be prepended to any residual bits from a prior scan. A bit count and the number of bits input are updated accordingly at step 304. The bits tested for in condition 302 are the number of bits that are contained in the input bit stream that is received at the receiver 28.

The bit count is tested at decision 306 to determine if it is greater than or equal 8. If it is not greater than or equal to 8, the processing returns to testing the number of bits remaining in the input bit stream at condition 302. If the bit count is determined to be greater than or equal to 8 at decision 306, the least significant octet in the 32 bit register 160 is used as an index into the decode table 50 (shown in FIG. 3) to obtain the entries for the value of the index at step 308. At decision 310, the entry is checked for a special pattern. If a special pattern is indicated by the value of the octet used to index into the table, decision 312 determines whether or not it is an HDLC flag. If an HDLC flag is determined, the 32 least significant bits are extracted from the output bit stream and subject to a byte reversal. The bytes are then placed into the received buffer 200 (shown in FIG. 3). At step 320 the output bit stream is cleared and 7 bits are shifted out of the residual bits in the 32 bit register. At decision 322, the residual bits are tested to determine if the flag was the value 0×7E. If it was 0×7E, one more bit is shifted from the residual bits at step 324 and processing returns to decision 306. If the residual bits were not the value 0×7E, the processing returns to decision 306.

If at decision 310, a special pattern was not detected in the table for the value of the index into the table, the number of bits indicated by the table entry are moved to the bit output buffer as shown at step 326. The bits are prepended to the output bit stream at step 328. The extracted bits are then shifted out of the residual bits in the 32 bit register 160, and the bit count is adjusted by the number of bits extracted at step 330. Decision 332 determines whether or not a 0 bit must be deleted from the octet that was tested. Step 334 ships one more bit out of the residual bits and adjust the bit count if the 0 bit must be deleted. If a 0 bit does not have to be deleted, decision 336 determines whether or not 32 bits are ready to be output from the decoder. If there are 32 bits in the output bit stream, step 338 extracts 32 least significant bits, performs a byte reversal and places the bytes into the receive buffer 200. Thirty-two bits are then shifted out of the output bit stream and processing returns to decision 306.

While the invention has been described in conjunction with presently preferred embodiments of the invention, persons of skill in the art will appreciate that variations may be made without departure from the scope and spirit of the invention. This true scope and spirit is defined by the appended claims, interpreted in light of the foregoing.

I claim:

1. A method for encoding data in a High level Data Link Control (HDLC) protocol frame comprising the steps of:

inputting a stream of data having a data width of w-bits into an N-bit register where N>w;

examining w-bits from the N-bit register and determining a bit count number of bits to transfer to an output buffer;

inserting a zero into the output buffer if the examined w-bits from the N-bit register indicates to perform a zero insert in accordance with the HDLC protocol;

outputting the bit count number of bits to the output buffer;

if the bit count number of bits =w, selecting a next w-bits from the N-bit register to examine, the next w-bits including a w-unexamined bits next to the examined w-bits;

if the bit count number of bits <w, selecting a next w-bits from the N-bit register to examine, the next w-bits including a number of bits equal to w minus the bit count from the examined w-bits and a number of unexamined bits equal to the bit count from the N-bit register; and repeating the steps of examining, inserting, outputting and selecting until all of the stream of data bits has been encoded.

2. The method of claim 1 wherein:

the step of examining the w-bits is taken from a least significant w-bits in the N-bit register.

3. The method of claim 1 wherein:

the step of examining the w-bits is taken a most significant w-bits in the N-bit register.

4. The method of claim 1 wherein the step of examining the w-bits from the N-bit register includes the step of:

indexing into a table having $2^w$ entries, each entry including the bit count and a zero insert indicator, the w-bits being used as an index.

5. A method for decoding data in a High level Data Link Control (HDLC) protocol frame comprising the steps of:

inputting a stream of data having a data width of w-bits into an N-bit register where N>w from a data field in the HDLC frame;

examining w-bits from the N-bit register and determining a bit count number of bits to transfer to an input buffer;

deleting a zero if the examined w-bits from the N-bit register indicates to perform a zero delete in accordance with the HDLC protocol;

inputting the bit count number of bits to an input buffer;

if the bit count number of bits=w, selecting a next w-bits from the N-bit register to examine, the next w-bits including a w-unexamined bits next to the examined w-bits;

if the bit count number of bits <w, selecting a next w-bits from the N-bit register to examine, the next w-bits including a number of bits equal to w minus the bit count from the examined w-bits and a number of unexamined bits equal to the bit count from the N-bit register; and repeating the steps of examining, inputting and selecting.

6. The method of claim 5 wherein:

the step of examining the w-bits is taken from a least significant w-bits in the N-bit register.

7. The method of claim 5 wherein:

the step of examining the w-bits is taken a most significant w-bits in the N-bit register.

8. The method of claim 5 further comprising the step of indexing into a table having $2^w$ entries, each entry including the bit count and a zero insert indicator, the w-bits being used as an index.

9. The method of claim 5 further comprising, after the step of determining the bit count number of bits to transfer, the step of determining if the w-bits comprise a special bit pattern.

10. The method of claim 9 further comprising the step of aborting the decoding method if the special bit pattern indicates a frame abort.

11. The method of claim 9 further comprising the step of synchronizing the data in accordance with the data width if the special bit pattern indicates a byte synchronization.

12. The method of claim 5 wherein the step of repeating the steps of examining, inputting and selecting is performed until a stream consisting of a selected number of w-bit units has been processed, and wherein the stream has an order of w-bit units, the method further comprising the steps of:

reversing of the order of w-bit units in the stream; and restarting the method from the step of inputting the stream of data.

13. The method of claim 5 wherein w=8, and wherein the step of repeating the steps of examining, inputting and selecting is performed until a stream consisting of 32 bits has been processed, and wherein the stream has an order of 8-bit units, the method further comprising the steps of:

reversing of the order of 8-bit units in the stream; and restarting the method from the step of inputting the stream of data.

14. An improved High level Data Link Control Layer encoder in a data communication system, the improvement comprising:

an N-bit register, where N>w, the N-bit register being operable to receive up to N data bits from data having a data width of w-bits;

a register controller coupled to the N-bit register, the register controller being operable to examine a w-bit unit from the N-bit register to determine a zero insert indicator and a bit count from the w-bits to output on a transmission medium, the register controller being operable to select a next w-bits from the N-bit register if the bit count is equal to w and, if a number of examined bits equal to w minus the bit count were not sent, to select the unsent examined bits and a number of unexamined bits equal to the bit count from the N-bit register; and an output buffer coupled to the N-bit register to receive the bit count number of bits, and, if the zero insert indicator is set, an inserted zero bit, the output buffer being coupled to the transmission medium to output the bits over the transmission medium.

15. The improvement of claim 14 further comprising:

an encoder table having $2^w$ entries, each entry comprising the zero indicator and the bit count, the examined w-bits being used as an index into the encoder table.

16. The improvement of claim 14 wherein the data width, w=8 bits.

17. An improved High level Data Link Control Layer decoder in a data communication system, the improvement comprising:

an N-bit register, where N>w, the N-bit register for receiving up to N data bits from data having a data width w-bits;

a decoder register controller coupled to the N-bit register, the register controller being operable to examine a w-bit unit from the N-bit register to determine a zero delete indicator and a bit count from the w-bits to transfer to an input buffer, the register controller being operable to select a next w-bits from the N-bit register if the bit count is equal to w and, if a number of examined bits equal to w minus the bit count were not sent, to select the unsent examined bits and a bit count number of unexamined bits from the N-bit register, the decode register controller operable to shift out a zero if the zero delete indicator indicates a zero delete; and an input buffer coupled to the N-bit register to receive the bit count number of bits, the input buffer being coupled to a receiver buffer.

18. The improvement of claim 17 further comprising a decoder table having $2^w$ entries, each entry comprising the zero delete indicator and the bit count, the examined w-bits being used as an index into the decoder table.

19. The improvement of claim 18 wherein each entry includes a special pattern indicating an action to be taken in response to receiving the special pattern.

20. The improvement of claim 19 wherein the special pattern may be a value selected from the group consisting of a first pattern for a frame abort and a second pattern for a byte synchronization.

\* \* \* \* \*